June 12, 1923.

C. R. SCOTT 1,458,857

BOLL WEEVIL EXTERMINATOR

Filed Oct. 14, 1922   3 Sheets-Sheet 3

C. R. Scott
INVENTOR

BY Victor J. Evans
ATTORNEY

WITNESS:

Patented June 12, 1923.

1,458,857

UNITED STATES PATENT OFFICE.

CHARLES R. SCOTT, OF BELLS, TEXAS.

BOLL-WEEVIL EXTERMINATOR.

Application filed October 14, 1922. Serial No. 594,621.

*To all whom it may concern:*

Be it known that I, CHARLES R. SCOTT, a citizen of the United States, residing at Bells, in the county of Grayson and State of Texas, have invented new and useful Improvements in Boll-Weevil Exterminators, of which the following is a specification.

This invention relates to insect destroyers, and has for its object the provision of a novel machine designed to be drawn along the ground in cotton fields for the purpose of removing from the rows of plants the weevils and punctured squares thereon, the device being equipped with means for collecting the insects and debris so that they may be subsequently destroyed.

An important object is the provision of a machine of this character which is provided with novel means for shaking the plants automatically so that the insects thereon will be knocked or shaken off into the pan.

An additional object is the provision of a device of this character which will be simple and inexpensive in manufacture, easy to operate, positive in action, durable in service and a general improvement in the art.

Figure 1:
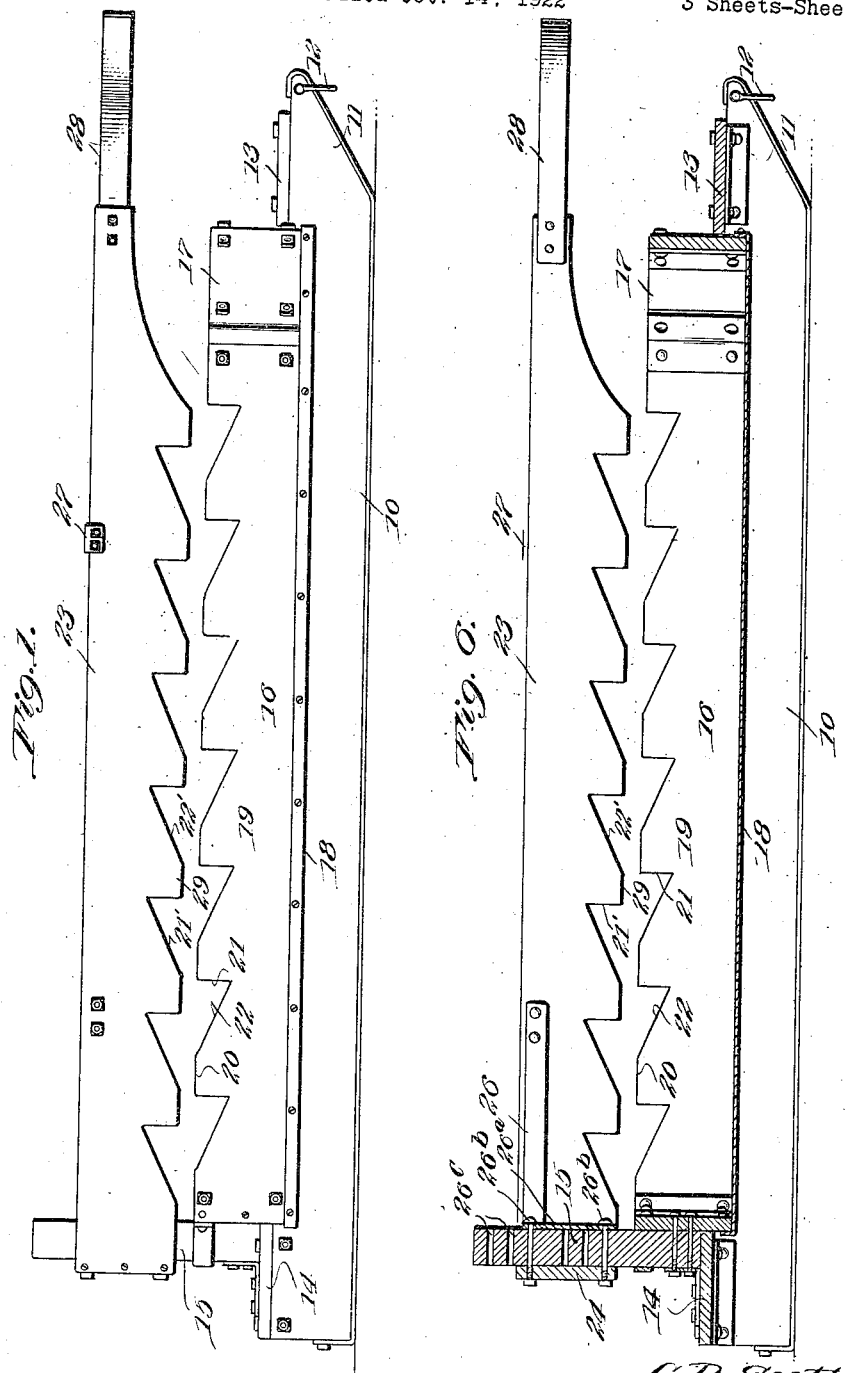
Figure 2:
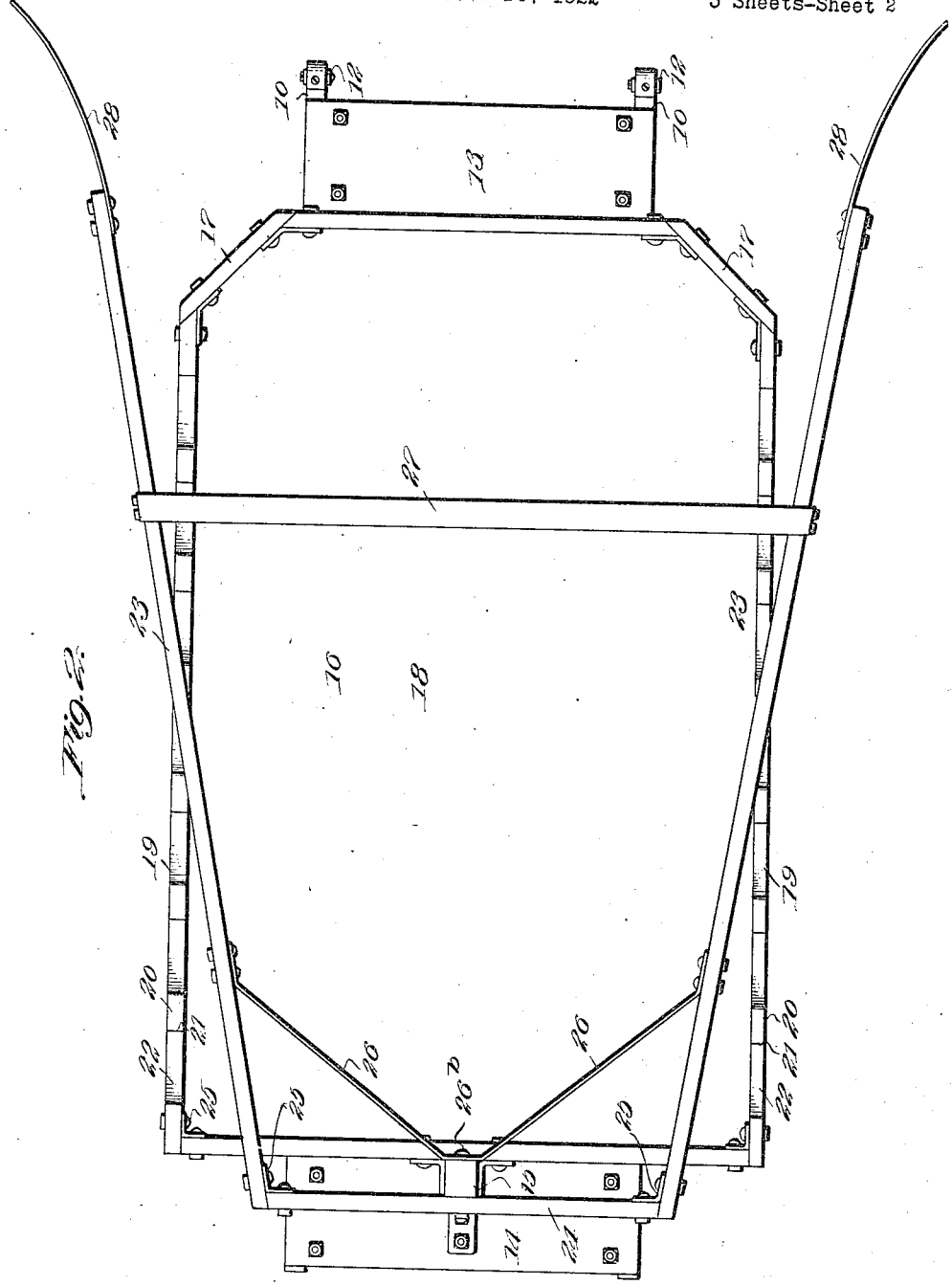
Figure 3:
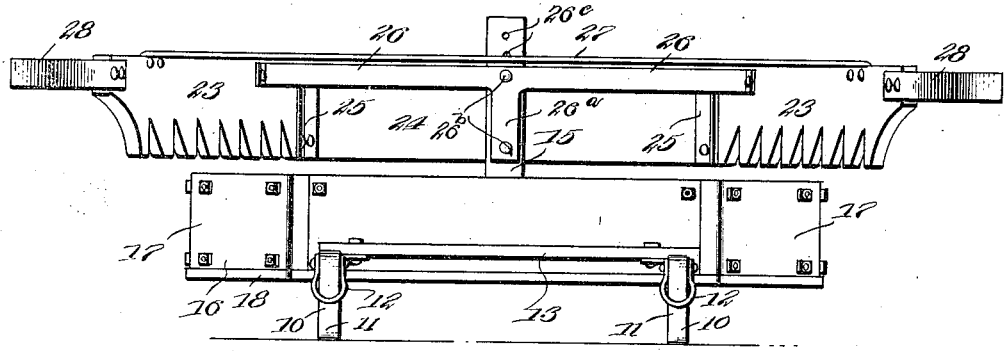
Figure 4:
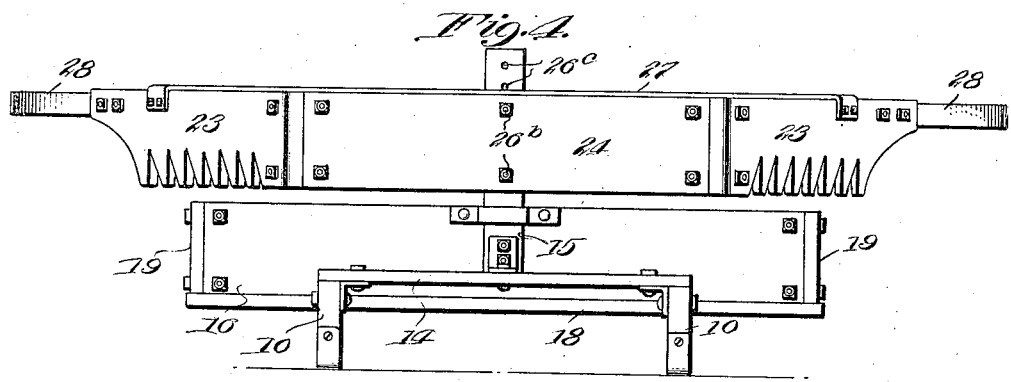
Figure 5:
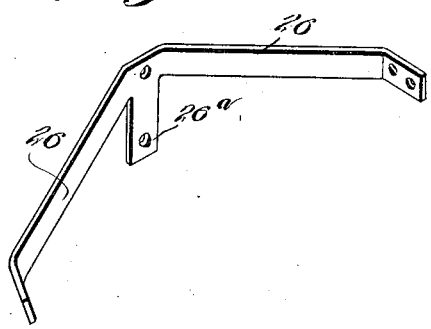

With the above and other objects and advantages in view the invention consists in the details of construction to be hereinafter more fully described and claimed and illustrated in the accompanying drawings, in which:

Figure 1 is a side elevation of the device,
Figure 2 is a top plan view,
Figure 3 is a front elevation,
Figure 4 is a rear elevation,
Figure 5 is a detail perspective view of a supporting element and
Figure 6 is a longitudinal section.

Referring more particularly to the drawings the numeral 10 designates a pair of skids or runners which are preferably shod with metal, in case they are constructed of wood or which may be constructed entirely of some suitable angle bars. At their forward ends these runners are beveled as shown at 11 and are equipped with clevises 12 for the attachment of any suitable draft means. Connecting the forward and rear ends of the runners are platforms 13 and 14 respectively from the latter of which rises a standard 15 for a purpose to be described.

Mounted upon the runners and preferably let down thereinto is an elongated pan 16 which is of rectangular shape except that its forward corners are inclined as shown at 17. This pan may be constructed of any suitable frame work and is provided with a bottom 18. The sides 19 have their upper edges formed with teeth 20 shaped like ratchet teeth and each having a vertical shoulder 21 and an upwardly and rearwardly inclined upper edge 22.

Mounted above the pan are shaker arms 23 connected at their rear ends by a cross bar 24 which is adjustably supported by the standard 15. The corners where the bar 24 joins the arms 23 are reinforced by angular braces 25, and I also provide a brace including divergent arms 26 which are secured to the arms 23 and to opposite sides of the standard 15, and further including a depending arm 26ª. The mounting for the arms 23 consists of a pair of bolts 26ᵇ which pass through holes in the depending portion 26ª, through similar holes in the member 24 and through any pair of a plurality of holes 26ᶜ in the upright 15. By this means the arms 23 may be adjusted vertically with respect to the remainder of the device.

Near their forward ends the arms 23 are connected by a transverse rod or bar 27 which will add to their strength and rigidity. These arms are arranged in rearwardly converging relation and their forward ends project beyond the sides of the pan as shown in Figure 2. The forward extremities carry outwardly curved gathering fingers 28 for a purpose to be described. The lower edges of the arms are formed with teeth 29 which are arranged opposite the teeth 20 and each of which includes a vertical shoulder 21' and a downwardly and rearwardly inclined face of edge 22'.

In the operation the device is drawn along the ground in such a position that two successive rows of cotton plants will enter between the sides of the pans and the gathering fingers 28. As the machine is drawn along, the plants will be forced between the toothed upper edges of the pans and the corresponding toothed lower edges of the arms 23, whereupon the plants passing over the inclined surfaces of the teeth and occasionally snapping over the shoulders will be violently shaken so that the weevils and punctured squares will be knocked off and fall into the pan. When a considerable accumulation has formed in the pan it is removed and destroyed. Owing to the fact that the arms cross the sides of the pan it is apparent that the plants will be bent over so that their tops will extend above the pan. The passage of the stalks between the teeth will thus cause the plants to be shaken up and down so that the insects must drop into the pan. The adjustable mounting of the upper toothed arms is important as it makes the device usable at all times for treating plants of different heights.

From the foregoing description and a study of the drawings it will be apparent that I have thus provided a simply constructed and consequently inexpensive device which will effectually operate to remove from growing cotton plants all the boll weevils and punctured squares thereon, the device operating very rapidly and requiring no special skill in its manipulation. The agitating means is very simple and includes no moving parts so that there is nothing whatever to get out of order.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A boll weevil exterminator comprising a collecting pan mounted upon skids provided with draft means, forwardly extending divergent arms mounted at the rear end of the machine and projecting beyond the sides of the pan at their forward ends, the upper edges of the sides of the pan being formed with ratchet teeth.

2. A boll weevil exterminator comprising a collecting pan mounted upon skids provided with draft means, forwardly extending divergent arms mounted at the rear end of the machine and projecting beyond the sides of the pan at their forward ends, the upper edges of the sides of the pan being formed with ratchet teeth, and the lower edges of the arms being likewise formed with similarly arranged ratchet teeth.

3. A machine of the character described comprising an elongated gathering pan, supporting skids for the pan provided with draft means, a standard at the rear end of the pan, forwardly diverging shaker arms supported by said standard and extending diagonally across the sides of the pan with their forward ends extending beyond the pan and carrying gathering fingers, the upper edges of the sides of the pan and the lower edges of the arms being formed with ratchet teeth.

4. A machine of the character described comprising an elongated gathering pan, supporting skids for the pan provided with draft means, a standard at the rear end of the pan, forwardly diverging shaker arms supported by said standard and extending diagonally across the sides of the pan with their forward ends extending beyond the pan and carrying gathering fingers, the upper edges of the sides of the pan and the lower edges of the arms being formed with ratchet teeth, and means for adjusting the height of said arms above the pan.

In testimony whereof I affix my signature.

CHARLES R. SCOTT.